Sept. 10, 1940.  D. A. ROGERS ET AL  2,214,068
PROCESS FOR THE PRODUCTION OF UREA FROM AMMONIA AND
CARBON DIOXIDE CONTAINING INERTS
Filed Jan. 20, 1939
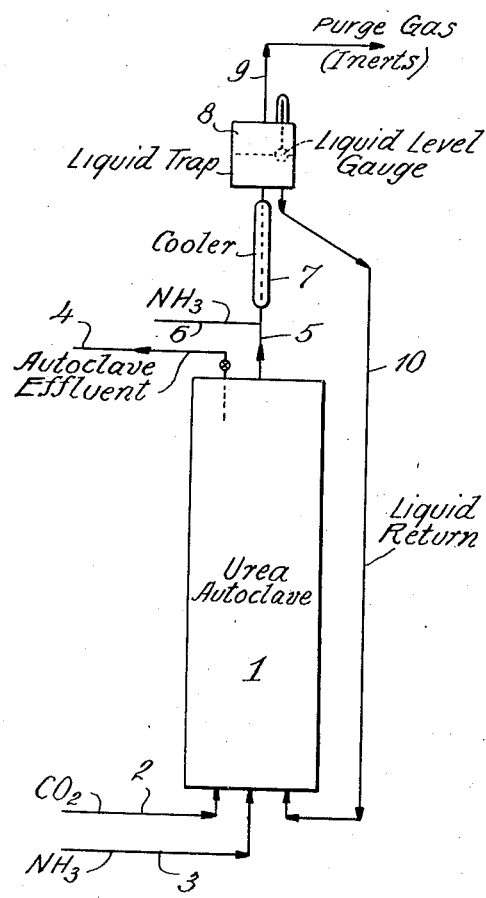
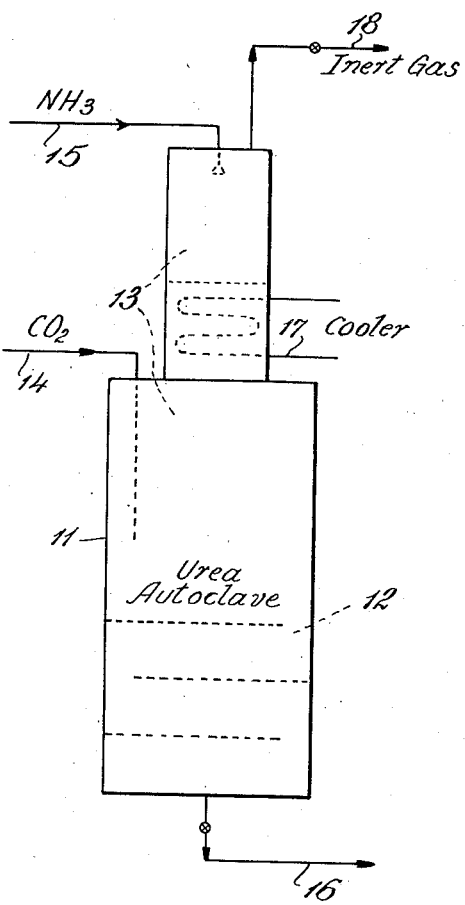
INVENTORS
Donald A. Rogers
Frank Porter
BY
Charles W. Brown
ATTORNEY Patented Sept. 10, 1940

2,214,068

UNITED STATES PATENT OFFICE 2,214,068

PROCESS FOR THE PRODUCTION OF UREA FROM AMMONIA AND CARBON DIOXIDE CONTAINING INERTS

Donald A. Rogers, Petersburg, Va., and Frank Porter, Syracuse, N. Y., assignors to The Solvay Process Company, New York, N. Y., a corporation of New York Application January 20, 1939, Serial No. 251,884

7 Claims. (Cl. 260—555)

This invention relates to a process for the synthesis of urea from ammonia and carbon dioxide which contain gases inert in the reaction.

It is well known urea may be synthesized from ammonia and carbon dioxide by heating these materials together in a suitable autoclave at high temperature and pressure. When obtained from commercial sources the ammonia and carbon dioxide ordinarily contain a substantial quantity of inert non-condensable gases, particularly hydrogen, nitrogen, argon and carbon monoxide. These inert gases may be present in the ammonia, or carbon dioxide or both, in amounts up to 5 mols of inerts to 100 mols of reactants (ammonia and carbon dioxide) supplied to the urea synthesis autoclave. These inerts enter a vapor phase in the autoclave which contains a substantial quantity of ammonia and carbon dioxide. The synthesis of urea is primarily a liquid phase reaction with little or no urea being formed in the vapor phase present in the autoclave. For this reason it is highly desirable to prevent the accumulation of inert gases in the urea autoclave; yet to purge the gases from the urea synthesis system entails a substantial loss of ammonia and carbon dioxide from that system. It it is, of course, possible to remove the inerts from the ammonia and carbon dioxide before they are introduced into the urea synthesis system but this is an expensive process.

It is an object of this invention to provide a process in which ammonia and carbon dioxide containing substantial quantities of inert gases are supplied to a urea synthesis system but the inert gases are removed and their accumulation in that system is prevented without decreasing the efficiency of the process by also removing substantial quantities of the ammonia and carbon dioxide which have not as yet reacted to form urea.

We have discovered that in synthesizing urea in a system into which ammonia and carbon dioxide containing inert gases are introduced, accumulation of the inert gases in the synthesis system may be prevented without materially decreasing the efficiency of the system by purging the inert gases from the high pressure system only after cooling the gases to a temperature materially below the temperature in the urea synthesis autoclave, or zone in that autoclave, in which the high temperatures are maintained which promote the synthesis of the ammonia and carbon dioxide to form urea. By thus cooling the inert gases saturated with ammonia and carbon dioxide vapors at the urea synthesis temperatures while still maintaining the gases under the synthesis pressure, substantially all of the ammonia and carbon dioxide may be condensed and the condensate returned to the synthesis zone in the urea autoclave. The inert gases from which the ammonia and carbon dioxide have been condensed may then be purged from the high pressure synthesis system without materially reducing the efficiency of the synthesis process by carrying with them the ammonia and carbon dioxide saturating the inert gases at the systhesis temperature. This procedure is advantageously employed in synthesizing urea from ammonia and carbon dioxide containing the inerts present in mixtures of the commercial materials, which commonly contain 2 mols or less inerts per 100 mols ammonia and carbon dioxide.

In carrying out this invention the inert gases are withdrawn from the zone in the urea synthesis autoclave in which the high synthesis temperatures and pressures are maintained and are cooled to a materially lower temperature than the urea synthesis temperature, for example to 35° C. or more below the temperature maintained in the urea synthesis zone of the autoclave, to condense the ammonia and carbon dioxide while still maintaining the gases under the high synthesis pressure. The inert gases thus freed of a large proportion of their ammonia and carbon dioxide contents are then purged from the high pressure synthesis system. The ammonia and carbon dioxide removed from the inert gases (which in condensing form ammonium carbamate) are returned to the synthesis zone of the autoclave. When the inert gases are indirectly cooled the cooling coils or other means used for indirectly cooling the gases are maintained at a temperature of about 155° C. or higher in order that the condensed ammonium carbamate may flow from the cooler used to condense it from the inert gases into the synthesis zone of the autoclave.

In thus treating the inert gases to condense ammonia and carbon dioxide from them before they are purged from the high pressure synthesis system, we have found the ratio of carbon dioxide to ammonia in the gas phase in contact with a liquid phase containing ammonium carbamate may be in excess of that required to form ammonium carbamate even though the ammonia in the liquid phase is in considerable excess over the 2 mols of ammonia to 1 mol of carbon dioxide which unite to form ammonium carbamate. This excess carbon dioxide in the gas phase cannot readily be condensed merely by cooling the gases. Accordingly, although the process described above is effective to remove the ammonia and a large proportion of the carbon dioxide from the inert gases before bleeding the latter from the urea synthesis system and thus represents a material improvement in the efficiency of a urea synthesis process over removing the inert gases from the ammonia and carbon dioxide before introduction into the urea synthesis or bleeding the inert gases from the high pressure system without first cooling them to condense ammonia and carbon dioxide and returning the condensate to the urea synthesis zone, we have discovered even more effective methods which may be employed to treat the inert gases before purging them from the high pressure system while retaining in that system both the ammonia and carbon dioxide with which the inert gases are saturated at the high temperature of the reaction zone in the urea autoclave.

We have discovered the inert gases may be substantially freed of both their ammonia and carbon dioxide contents before purging the gases from the high pressure synthesis system by cooling the gases in contact with the autoclave liquid, with liquid ammonia which is later introduced into the synthesis zone of the autoclave or with both autoclave liquid and liquid ammonia which is to be supplied to the synthesis zone of the autoclave. We have discovered that by thus cooling the inert gases in contact with one or a mixture of these liquids, substantially all of the carbon dioxide as well as the ammonia saturating the inert gases at the autoclave temperatures may be condensed either as a solution or as a slurry of ammonium carbamate which may be returned to the synthesis zone in the urea autoclave. The inert gases thus freed of their ammonia and carbon dioxide are then purged from the high pressure synthesis system. By thus condensing the ammonia and carbon dioxide in contact with one of these liquids, the inert gases may be cooled to any temperature below the temperature maintained in the urea synthesis zone of the autoclave to separate ammonia and carbon dioxide from the inert gases, although it is preferred to cool the gases to at least 50° C. below the urea synthesis temperature.

The accompanying drawing illustrates two methods for carrying out the process of this invention. In Fig. 1 there is illustrated a procedure in which the inert gases are cooled in contact with both autoclave liquid and a part of the liquid ammonia to be fed to the autoclave. Fig. 2 illustrates a procedure in which the inert gases are cooled in contact with all of the ammonia which is being fed to the urea synthesis autoclave. The examples illustrated in this drawing and described below are illustrative of our invention.

With reference to Fig. 1, the numeral 1 designates a urea synthesis autoclave to which there is continuously fed through a pipe 2 liquid carbon dioxide and through a pipe 3 liquid ammonia in the proportions of 100 mols of carbon dioxide for every 200 mols of ammonia. This ammonia and carbon dioxide contains a total of about 5 mols of inert gases such as nitrogen, hydrogen and carbon monoxide. A pressure of about 175 atmospheres is maintained in autoclave 1 and the material in the autoclave is heated at a temperature of about 185° C. At this temperature and pressure the ammonia and carbon dioxide (or ammonium carbamate and other compounds of ammonia and carbon dioxide or free liquid ammonia and carbon dioxide, which it is recognized may exist in the autoclave liquid in a urea synthesis process) react to form urea and water as the reaction mixture flows from the bottom towards the top of the autoclave. The resulting liquid containing urea, water and unconverted carbamate flows out of the top of the autoclave through a pipe 4 to be treated in any of the well known manners to recover its constituents.

A part of the autoclave liquid is passed from the top of the autoclave through a pipe 5 and, after being mixed with liquid ammonia from a pipe 6 in the proportions of about 80 mols of ammonia for every 300 mols of ammonia and carbon dioxide introduced to the autoclave from pipes 2 and 3, is passed through a cooler 7 to a liquid trap 8. The inert gases introduced into the autoclave with the carbon dioxide and ammonia rise to the top of the autoclave and pass with the autoclave liquid and added ammonia through pipe 5 and cooler 7. In cooler 7 the temperature of the mixture of liquid ammonia and autoclave liquid is reduced to about 130° C. At this temperature the ammonia and carbon dioxide saturating the inert gases at the urea synthesis temperature maintained in autoclave 1 are condensed to form ammonium carbamate. The amount of autoclave liquid and ammonia passed through cooler 7 with the inert gases is in excess of that necessary to dissolve the carbamate formed from the carbon dioxide accompanying the inert gases passing through the cooler. In liquid trap 8 the inert gases, now substantially freed from gaseous ammonia and carbon dioxide, are separated from the liquid in contact with which the gases are cooled and the inert gases are then purged from the high pressure urea synthesis system through a pipe 9. The liquid separated from the inert gases, now containing substantially all of the ammonia and carbon dioxide fed to the urea synthesis system through pipes 2, 3 and 6, except that drawn off as autoclave effluent through pipe 4, flows by gravity through liquid return pipe 10 into the bottom of autoclave 1 where the ammonia and carbon dioxide contained in this liquid are again subjected to the high temperatures required for urea synthesis.

By mixing additional ammonia with the autoclave liquid in contact with which the inert gases are cooled as in the above example, the excess of ammonia in the resulting mixture aids in freeing the inert gases of their carbon dioxide content before they are purged from the high pressure synthesis system. By maintaining present in the autoclave liquid in contact with which the inert gases are cooled a ratio of ammonia to carbon dioxide (both free and combined ammonia and carbon dioxide) equivalent to 2 mols or more ammonia for every 1 mol of carbon dioxide, the inert gases may be substantially freed from both ammonia and carbon dioxide before purging them from the high pressure synthesis system by cooling to about 130° C. or lower.

Instead of withdrawing autoclave liquid for contact with the inert gases during their cooling from the top of the autoclave, as in the example described above, this liquid may be withdrawn from a lower portion of the autoclave so long as it consists of reaction mixture in which the ammonia and carbon dioxide introduced to the autoclave for the synthesis of urea has reacted to a degree represented by at least 25% conversion of the inlet carbon dioxide. Accordingly, when in this specification and in the appended claims reference is made to "autoclave liquid," it is intended to refer to a reaction mixture drawn from the synthesis zone of a urea synthesis autoclave having a composition corresponding to conversion of 25% or more of the carbon dioxide introduced to the autoclave. To this liquid withdrawn from the autoclave additional ammonia may or may not be added before the liquid is contacted with the inert gases drawn from the synthesis zone of the autoclave in the step in which the gases are cooled to condense ammonia and carbon dioxide.

With reference to Fig. 2, the numeral 11 designates a urea synthesis autoclave containing two zones; a urea synthesis zone 12 and a cooling zone 13. Carbon dioxide is introduced directly into the synthesis zone 12 by means of a pipe 14. Liquid ammonia is sprayed into the top of cooling zone 13 from a pipe 15 and, after passing through the cooling zone, flows into synthesis zone 12. The carbon dioxide and ammonia are introduced in the proportions of 100 mols of carbon dioxide to 200 mols of ammonia and carry into the autoclave as impurities about 5 mols of inert gas (hydrogen, nitrogen, carbon monoxide and the like). The autoclave is maintained under a pressure of about 200 atmospheres and the ammonia and carbon dioxide in synthesis zone 12 are maintained at a temperature of about 190° C. At that temperature and pressure the ammonia and carbon dioxide react to form urea. Urea, water and unconverted ammonia and carbon dioxide are continuously withdrawn from the bottom of the autoclave through a pipe 16 and treated, as in the case of the autoclave effluent produced in the process of the above example, to recover the constituents.

Inert gases evolved from the reactants in the high temperature synthesis zone and saturated with ammonia and carbon dioxide at the temperature reigning in that zone rise upwardly through the liquid in the cooling zone 13 of the autoclave. The gases first contact with liquid in the lower portion of the cooling zone at about 130° C. to partially condense the ammonia and carbon dioxide accompanying the inert gas. Then in the top portion of the cooling zone substantially all the remaining ammonia and carbon dioxide are removed from the inert gases by washing with the liquid ammonia. By washing the gas with liquid ammonia at a temperature below 100° C. substantially all of the ammonia and carbon dioxide accompanying the inert gases are condensed as solid particles of ammonium carbamate suspended in the liquid ammonia. The ammonia used for washing the gas and the ammonia and carbon dioxide recovered from the gas pass through the cooling zone and into reaction zone 12 of the autoclave. The inert gases substantially freed of carbon dioxide and ammonia, are purged from the high pressure urea synthesis system through a pipe 18.

The foregoing examples describe representative conditions maintained in the synthesis zone of the urea autoclave for the synthesis of urea from ammonia and carbon dioxide but are not intended in this respect to limit the conditions under which the synthesis zone may be operated in practicing our invention. As is well known, the synthesis of urea involves maintaining the reactants at high temperatures and under high pressures and any specific conditions suitable for urea synthesis may be maintained in the autoclave. It is also known to employ various ratios of ammonia to carbon dioxide in the reaction mixture and our invention is not limited to any particular proportions of these reactants, although it is preferred to introduce into the synthesis zone of the autoclave the ammonia in amounts greater than two mols of ammonia for every one mol of carbon dioxide, for example, up to 5 mols ammonia per mol of carbon dioxide. By withdrawing the inert gases from contact in the urea synthesis zone with reaction mixture containing a high enough ratio of ammonia to carbon dioxide so that the gases contain at least 7 mols ammonia to 1 mol of carbon dioxide, when the gases are cooled to below 100° C., they are substantially freed of their ammonia and carbon dioxide with the direct formation of a slurry of solid ammonium carbamate in liquid ammonia containing at least 7 mols ammonia to every 1 mol carbon dioxide. Such a slurry is sufficiently fluid at temperatures as low as 40° C. to be conveyed into the synthesis zone. The excess of ammonia in the slurry effects the substantially complete condensation of the carbon dioxide accompanying the inert gases. When the proportion of ammonia to carbon dioxide in the gases to be cooled is below 7 mols ammonia to 1 mol carbon dioxide, we prefer to supply additional ammonia to the condensate formed in cooling the gases so that the gases are cooled in contact with a mixture of condensate from the gases and additional ammonia which contains the above proportions of at least 7 mols ammonia to 1 mol carbon dioxide.

We claim:

1. In a process for the synthesis of urea from ammonia and carbon dioxide the improvement which comprises introducing into a high pressure urea synthesis system said ammonia and carbon dioxide containing inert gases which enter a gaseous phase present in a urea synthesis zone in said high pressure system in which zone the ammonia and carbon dioxide are heated to high temperatures for the synthesis of urea therefrom, withdrawing the inert gases accompanied by gaseous ammonia and carbon dioxide from said synthesis zone, cooling the withdrawn gases while still maintaining them under substantially the pressure maintained in said synthesis zone to condense ammonia and carbon dioxide from the inert gases, thereafter purging the inert gases from the high pressure urea synthesis system and returning to said urea synthesis zone the ammonia and carbon dioxide condensed from said inert gases without release of the pressure under which they are condensed.

2. In a process for the synthesis of urea from ammonia and carbon dioxide the improvement which comprises introducing into a high pressure urea synthesis system said ammonia and carbon dioxide containing not more than 2 mols inert gases for every 100 mols of ammonia and carbon dioxide, said inert gases entering a gaseous phase present in a urea synthesis zone in said high pressure system in which zone the ammonia and carbon dioxide are heated to high temperatures for the synthesis of urea therefrom, withdrawing the inert gases accompanied by gaseous ammonia and carbon dioxide from said synthesis zone, cooling the withdrawn gases to a temperature at least 35° C. below the temperature at which the gases are withdrawn from said synthesis zone while still maintaining them under substantially the pressure maintained in said synthesis zone to condense ammonia and carbon dioxide from the inert gases and thereafter purging the inert gases from the high pressure urea synthesis system and returning to said urea synthesis zone the ammonia and carbon dioxide condensed from said inert gases without release of the pressure under which they are condensed.

3. The process for synthesizing urea from ammonia and carbon dioxide which comprises introducing ammonia and carbon dioxide into a high pressure urea synthesis system and in that system passing the ammonia and carbon dioxide into an autoclave in which they are heated at a high temperature and under a high pressure to synthesize urea therefrom, said ammonia and carbon dioxide introduced into said system containing inert gases which enter a gaseous phase in contact with the reaction mixture in said autoclave, withdrawing the inert gases from the synthesis zone in said autoclave accompanied by gaseous ammonia and carbon dioxide, withdrawing autoclave liquid from said urea synthesis zone, cooling said inert gases in contact with said withdrawn autoclave liquid to condense in said liquid ammonia and carbon dioxide from said inert gases while maintaining the gases and autoclave liquid under substantially the high pressure maintained in said autoclave, thereafter purging from said urea synthesis system said inert gases from which ammonia and carbon dioxide have been condensed, and returning to the urea synthesis zone of said autoclave the autoclave liquid containing ammonia and carbon dioxide condensed from said inert gases.

4. The process for synthesizing urea from ammonia and carbon dioxide which comprises introducing ammonia and carbon dioxide into a high pressure urea synthesis system and in that system passing the ammonia and carbon dioxide into an autoclave in which they are heated at a high temperature and under a high pressure to synthesize urea therefrom, said ammonia and carbon dioxide introduced into said system containing inert gases which enter a gaseous phase in contact with the reaction mixture in said autoclave in the proportions of not more than 2 mols of inert gases for every 100 mols of ammonia and carbon dioxide, withdrawing the inert gases from the synthesis zone in said autoclave accompanied by gaseous ammonia and carbon dioxide, withdrawing from said urea synthesis zone autoclave liquid in which the ammonia and carbon dioxide introduced into the autoclave have reacted to convert to urea at least 25% of the carbon dioxide, cooling said inert gases in contact with said withdrawn autoclave liquid to a temperature at least 50° C. below the temperature at which the inert gases are withdrawn from said synthesis zone to condense in said liquid ammonia and carbon dioxide from said inert gases while maintaining the gases and autoclave liquid under substantially the high pressure maintained in said autoclave, thereafter purging from said urea synthesis system said inert gases from which ammonia and carbon dioxide have been condensed, and returning to the urea synthesis zone of said autoclave the autoclave liquid containing ammonia and carbon dioxide condensed from said inert gases.

5. The process for the synthesis of urea which comprises continuously introducing carbon dioxide and liquid ammonia into the reaction zone in a urea synthesis autoclave in which the ammonia and carbon dioxide are heated at high temperatures and high pressures to synthesize urea therefrom, said ammonia and carbon dioxide containing inert gases which enter a gaseous phase in said urea synthesis zone, withdrawing the evolved inert gases accompanied by gaseous ammonia and carbon dioxide from said synthesis zone, cooling said gases while under substantially the same high pressure maintained in said synthesis zone while passing the gases in contact with at least a portion of the aforesaid liquid ammonia to condense ammonia and carbon dioxide from said inert gases as solid ammonium carbamate suspended in said liquid ammonia, thereafter purging the inert gases from which ammonia and carbon dioxide have been condensed from said high pressure synthesis system and passing the liquid ammonia, accompanied by the ammonium carbamate condensed from said inert gases, into said synthesis zone.

6. In a process for the synthesis of urea from ammonia and carbon dioxide the improvement which comprises introducing into a high pressure urea synthesis system said ammonia and carbon dioxide containing inert gases which enter a gaseous phase in a urea synthesis zone in said high pressure system in which the ammonia and carbon dioxide are heated to high temperatures for the synthesis of urea therefrom, withdrawing the evolved inert gases accompanied by gaseous ammonia and carbon dioxide from said synthesis zone, cooling the withdrawn gases to below 100° C. while still maintaining them under substantially the pressure maintained in said synthesis zone to condense ammonia and carbon dioxide from the inert gases, thereafter purging the inert gases from the high pressure urea synthesis system and returning within said high pressure synthesis system and without release of the pressure under which they are condensed, the ammonia and carbon dioxide condensed from said inert gases to said urea synthesis zone, and in condensing said ammonia and carbon dioxide from the inert gases, supplying to the condensate while it is in contact with the inert gases containing ammonia and carbon dioxide whatever additional ammonia is required to maintain a ratio of at least 7 mols ammonia to 1 mol of carbon dioxide in the mixture of condensate and liquid ammonia with which the gases are contacted while being cooled.

7. The process for synthesizing urea from ammonia and carbon dioxide which comprises introducing ammonia and carbon dioxide into a high pressure urea synthesis system and in that system passing the ammonia and carbon dioxide into an autoclave in which they are heated at a high temperature and under a high pressure to synthesize urea therefrom, said ammonia and carbon dioxide introduced into said system containing inert gases which enter a gaseous phase in contact with the reaction mixture in said autoclave, withdrawing the inert gases from the synthesis zone in said autoclave accompanied by gaseous ammonia and carbon dioxide, withdrawing autoclave liquid from said urea synthesis zone, cooling the withdrawn autoclave liquid to a temperature at least 35° C. below the temperature at which said inert gases are withdrawn from the synthesis zone in the autoclave, introducing ammonia into the withdrawn liquid to increase the ratio of $NH_3$ to $CO_2$ contained therein, intimately contacting said inert gases with the thus cooled liquid containing the ammonia introduced thereinto to condense therein ammonia and carbon dioxide from the inert gases while maintaining the gases and autoclave liquid under substantially the high pressure maintained in said autoclave, thereafter purging from said urea synthesis system said inert gases from which ammonia and carbon dioxide have been condensed, and returning to the urea synthesis zone of said autoclave the autoclave liquid containing ammonia and carbon dioxide condensed from said inert gases.

DONALD A. ROGERS.
FRANK PORTER.